United States Patent
Grunberg et al.

(10) Patent No.: US 9,047,399 B2
(45) Date of Patent: Jun. 2, 2015

(54) GENERATING VISUALIZATION FROM RUNNING EXECUTABLE CODE

(75) Inventors: Roland Grunberg, Toronto (CA); Tianyi Wang, Toronto (CA)

(73) Assignee: Red Hat, Inc., Raleigh, NC (US)

(*) Notice: Subject to any disclaimer, the term of this patent is extended or adjusted under 35 U.S.C. 154(b) by 795 days.

(21) Appl. No.: 12/714,026

(22) Filed: Feb. 26, 2010

(65) Prior Publication Data

US 2011/0214108 A1    Sep. 1, 2011

(51) Int. Cl.
*G06F 9/44* (2006.01)
*G06F 11/34* (2006.01)
*G06F 11/36* (2006.01)
*G06F 11/32* (2006.01)

(52) U.S. Cl.
CPC ........ *G06F 11/3466* (2013.01); *G06F 11/3476* (2013.01); *G06F 11/3419* (2013.01); *G06F 2201/86* (2013.01); *G06F 2201/865* (2013.01); *G06F 11/3612* (2013.01); *G06F 11/3664* (2013.01); *G06F 11/323* (2013.01)

(58) Field of Classification Search
None
See application file for complete search history.

(56) References Cited

U.S. PATENT DOCUMENTS

| | | | | |
|---|---|---|---|---|
| 5,355,484 A | * | 10/1994 | Record et al. | 717/127 |
| 5,485,616 A | * | 1/1996 | Burke et al. | 717/133 |
| 5,603,032 A | * | 2/1997 | Attal | 717/127 |
| 5,669,000 A | * | 9/1997 | Jessen et al. | 717/127 |
| 5,740,443 A | * | 4/1998 | Carini | 717/133 |
| 5,754,861 A | * | 5/1998 | Kumar | 717/128 |
| 5,828,883 A | * | 10/1998 | Hall | 717/133 |
| 5,884,082 A | * | 3/1999 | Seidel et al. | 717/128 |
| 5,903,759 A | * | 5/1999 | Sun et al. | 717/128 |
| 6,202,199 B1 | * | 3/2001 | Wygodny et al. | 717/125 |
| 6,233,678 B1 | * | 5/2001 | Bala | 712/240 |
| 6,263,491 B1 | * | 7/2001 | Hunt | 717/130 |
| 6,282,701 B1 | * | 8/2001 | Wygodny et al. | 717/125 |
| 6,367,036 B1 | * | 4/2002 | Hansen | 714/45 |
| 6,493,868 B1 | * | 12/2002 | DaSilva et al. | 717/105 |
| 6,721,941 B1 | * | 4/2004 | Morshed et al. | 717/127 |
| 6,961,930 B1 | * | 11/2005 | Waldspurger et al. | 717/141 |
| 7,058,928 B2 | * | 6/2006 | Wygodny et al. | 717/128 |
| 7,386,839 B1 | * | 6/2008 | Golender et al. | 717/131 |
| 7,389,497 B1 | * | 6/2008 | Edmark et al. | 717/130 |
| 7,610,514 B2 | * | 10/2009 | Modani et al. | 714/38.1 |
| 7,730,460 B1 | * | 6/2010 | Warren et al. | 717/133 |
| 2002/0087949 A1 | * | 7/2002 | Golender et al. | 717/124 |
| 2003/0056200 A1 | * | 3/2003 | Li et al. | 717/128 |

(Continued)

OTHER PUBLICATIONS

John Lambert et al., "xdProf: A tool for the capture and analysis of stack traces in a distributed Java system", Case Western Reserve University, 1997, <http://xdprof.sourceforge.net/xdprof-paper.pdf>, pp. 1-10.*

(Continued)

*Primary Examiner* — Thuy Dao
*Assistant Examiner* — Samuel Hayim
(74) *Attorney, Agent, or Firm* — Lowenstein Sandler LLP

(57) ABSTRACT

A method and apparatus for generating visualizations from running executable code is described. In one embodiment, the method includes monitoring an executable software application while the software application is running. The method may also include capturing data indicative of runtime events that occur while the executable software application is run. In one embodiment, the method may further include generating a profile of the executable software application from the captured data, and rendering a visualization of the profile for display.

15 Claims, 11 Drawing Sheets

(56) References Cited

U.S. PATENT DOCUMENTS

| | | | |
|---|---|---|---|
| 2003/0088854 A1* | 5/2003 | Wygodny et al. | 717/130 |
| 2003/0117971 A1* | 6/2003 | Aubury | 370/321 |
| 2003/0120460 A1* | 6/2003 | Aubury | 702/182 |
| 2003/0120872 A1* | 6/2003 | Aubury | 711/141 |
| 2005/0183094 A1* | 8/2005 | Hunt | 719/315 |
| 2005/0223368 A1* | 10/2005 | Smith et al. | 717/128 |
| 2006/0206873 A1* | 9/2006 | Argade | 717/135 |
| 2006/0242627 A1* | 10/2006 | Wygodny et al. | 717/128 |
| 2007/0150870 A1* | 6/2007 | Fitch et al. | 717/128 |
| 2007/0283331 A1* | 12/2007 | Pietrek | 717/130 |
| 2008/0104096 A1* | 5/2008 | Doval et al. | 707/101 |
| 2009/0089764 A1* | 4/2009 | Lai et al. | 717/143 |
| 2010/0199266 A1* | 8/2010 | Warren et al. | 717/133 |
| 2010/0293527 A1* | 11/2010 | Austin et al. | 717/113 |
| 2011/0078661 A1* | 3/2011 | Shafi | 717/125 |
| 2011/0099539 A1* | 4/2011 | Shafi | 717/128 |
| 2011/0107313 A1* | 5/2011 | Baron | 717/130 |
| 2011/0214108 A1* | 9/2011 | Grunberg et al. | 717/128 |

OTHER PUBLICATIONS

Dorian Arnold et al., "Stack Trace Analysis for Large Scale Debugging", IEEE, 2007, <http://ieeexplore.ieee.org/stamp/stamp.jsp?tp=&arnumber=4227982>, pp. 1-10.*

Hsiang-Yang Chen et al., "Tamper-proofing Basis Path by Using Oblivious Hashing on Java", ACM, 2007, <http://delivery.acm.org/10.1145/1250000/1241762/p9-chen.pdf>, pp. 1-8.*

* cited by examiner

GENERATING VISUALIZATION FROM RUNNING EXECUTABLE CODE

TECHNICAL FIELD

Embodiments of the invention relate to the field of software application development, and more particularly, to generating visualizations from running executable code.

BACKGROUND

Software applications are often written and edited by users in development environments. Once application code is finalized, it is compiled and then run. Often compiling application code successfully, and without errors, is the only debugging performed by an applications developer. However, simply running an application reveals very little about how a software application functions at runtime, how efficient the application is, how efficient logical elements within the code are, etc. Such qualities of application code must be guessed or gleaned from running the code.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for generating visualizations from running executable code is described. In one embodiment, the method includes monitoring an executable software application while the software application is running. The method may also include capturing data indicative of runtime events that occur while the executable software application is run. In one embodiment, the method may further include generating a profile of the executable software application from the captured data, and rendering a visualization of the profile for display.

Figure 1:
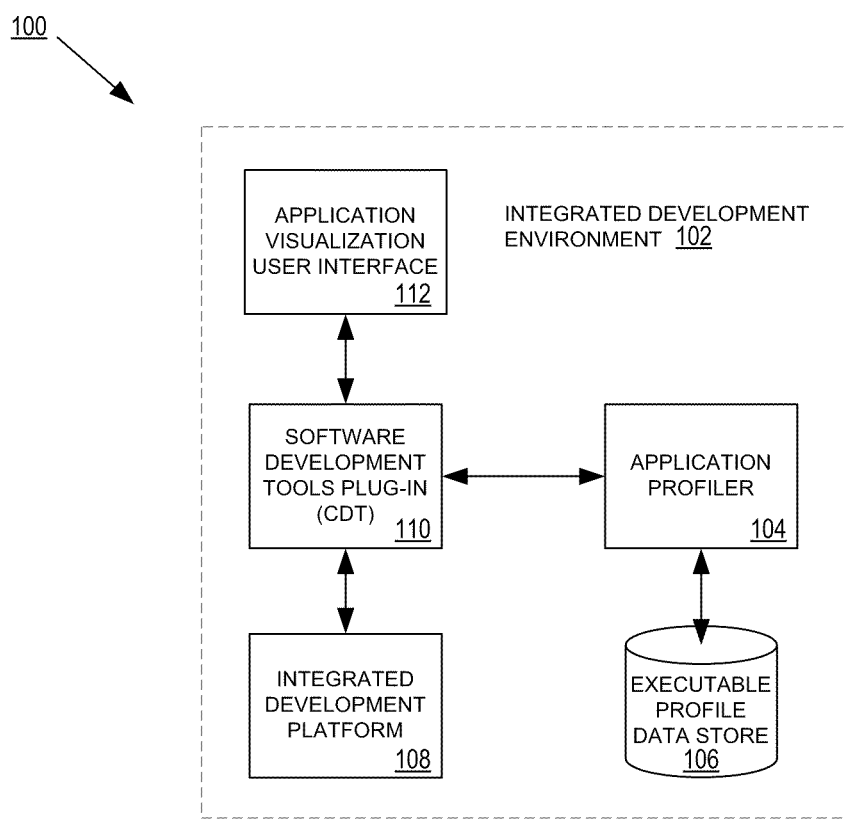
FIG. 1 is a block diagram of exemplary computer system for visualizing software applications.

FIG. 1 is a block diagram of exemplary computer system 100 for visualizing software applications. The computer system 100 may include one or more computing devices such as server computers, desktop computers, laptop computer systems, netbooks, etc. In one embodiment, the computer system 100 hosts an integrated development environment 102 that includes an integrated development platform 108, a software development tools plug-in 110, application profiler 104, and a data store to store executable application profile data files 106. For example, integrated development environment 102 may be the ECLIPSE™ multi-language software development environment for developing applications in software programming languages such as JAVA™, C, C++, Python, etc.

In one embodiment, integrated development platform 108 is run in a JAVA runtime environment. In one embodiment, integrated development platform 108 is a plug-in architecture and framework. In one embodiment, software development tools plug-in 110 is plugged into the integrated development platform 108. In one embodiment, the software development tools plug-in 110 is a C and C++ software development toolkit for tooling and developing C and/or C++ based software applications. The combination of the integrated development environment 108 and software development tools plug-in 110 provides a graphical interface and tools enabling a user to develop various software applications.

In one embodiment, software development tools plug-in 110 is coupled with application profiler 104. In one embodiment, application profiler 104 monitors executable applications while the executable applications are running in the integrated development environment 102. While an application is running, application profiler 104 determines when a function call is made within the application, as well as when a function closes or ends within the application. In one embodiment, application profiler 104 writes data to an executable application profile data file, and stores the file in a data store such as executable profile data store 106. The data store may be hosted by one or more storage devices that include one or more types of removable storage and/or one or more types of non-removal storage.

In one embodiment, application profiler 104 further reads function call data from the executable profile data store 106 to generate visualizations for functions in executable source code. In one embodiment, the profile includes runtime information profile data, such as the relationship between functions within the application, number of times each function was called, time taken by functions to execute, time taken by each function instance relative to the application's execution time, time taken by all instances of a function relative to the application's execution time, etc.

In one embodiment, application profiler 104 utilizes the profile data to render a visualization of an executable application in an application profile visualization user interface 112 of software development tools plug-in 110. FIGS. 7A-D illustrate exemplary embodiments of application profile visualization user interface 112 of the integrated development environment 102. In the illustrated embodiments, as will be discussed below, the visualization for an executable application may be a radial view visualization 700, tree view visualization 710, box view visualization 720, or aggregate view visualization 730.

In one embodiment, the rendered visualization for an application provides a software application developer insight into how a particular application runs. The visualizations, by displaying relationship between functions within the application, number of times each function was called, time taken by functions to execute, time taken by each function instance relative to the application's execution time, time taken by all instance of a function relative to the application's execution time, etc., provide an application programmer with a visual analysis of executable code and runtime statistics associated with the executable code. The runtime statistics enable an application programmer to focus his or her time and development efforts on specific portions of an application. For example, the profile data and corresponding visualization for an executable application may indicate that a particular function occupies 50% of the execution time for an application. Knowing this, an application programmer may then focus optimization efforts on that particular function.

In one embodiment, the visualizations illustrated in FIGS. 7A-D may be generated and rendered for an executable application after the executable application has completed running. In another embodiment, the visualizations may be generated and rendered in real time as an application is running.

Figure 2:
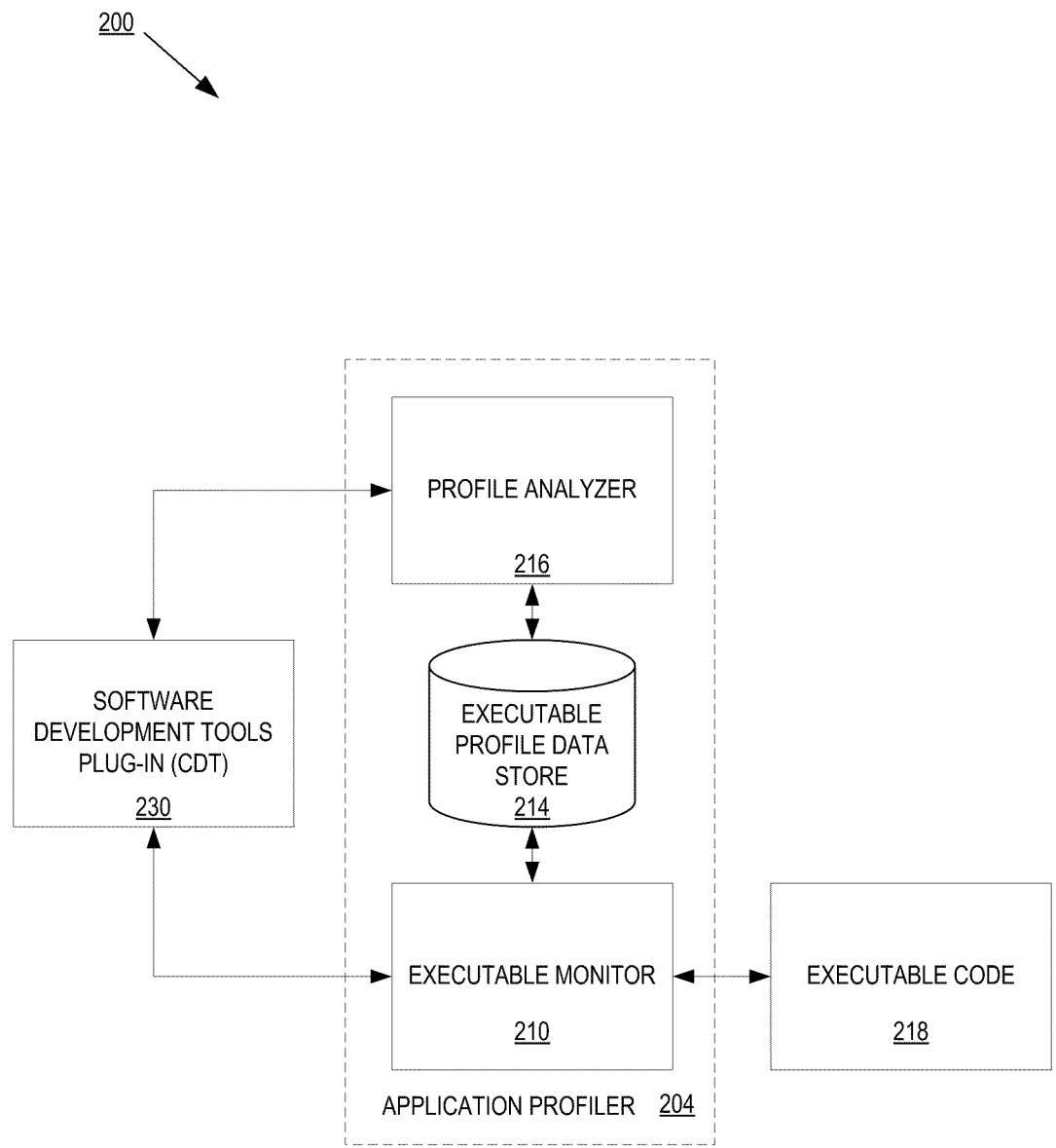
FIG. 2 is a block diagram of an architecture for generating executable application visualizations.

FIG. 2 is a block diagram of an architecture 200 for generating executable application visualizations. In one embodiment, the architecture 200 provides additional details for the application profiler 104 discussed above in FIG. 1. In one embodiment, application profiler 204 includes an executable monitor 210, executable profile data store 214, and a profile analyzer 216.

In one embodiment, executable monitor 210 receives data from software development tools plug-in 230 indicating a user's selection of executable code to be profiled, such as executable code 218. In one embodiment, the executable code 218 is run and executable monitor 210 monitors the running executable code 218 for events that occur while the executable code 218 is run.

In one embodiment, the executable code is run in an integrated development environment, such as integrated development environment 102 of FIG. 1. In one embodiment, executable monitor 210 is a script program run in an integrated development environment while the executable code is also run. In one embodiment, the script is a script program written in SYSTEMTAP™.

In one embodiment, executable monitor 210 monitors the running executable code to intercept and capture events that occur within the executable code during runtime. In one embodiment, executable monitor 210 determines when function calls occur within the running executable code, as well as when the called functions end or otherwise close. In one embodiment, executable monitor 210 stores data indicative of the function events in a file at executable profile data store 214. As will be discussed in greater detail below, profile analyzer utilizes the function event data to generate a profile of the executable code 218.

Figure 6:
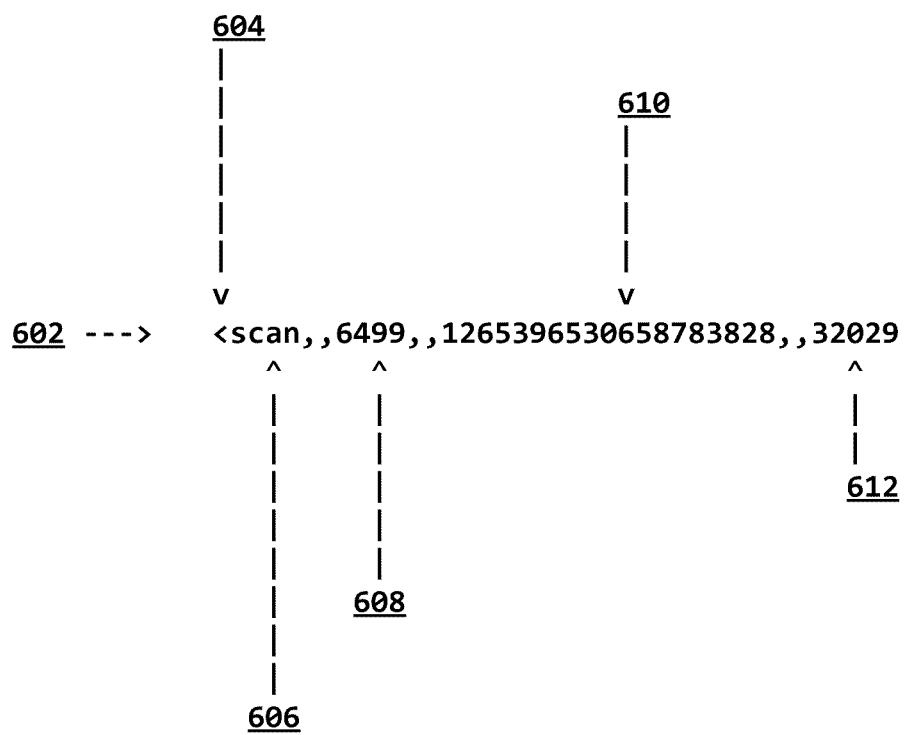
FIG. 6 illustrates one embodiment of a line of formatted data for a monitored function event written to a profile file.

In one embodiment, executable monitor 210 writes function event data, for each function event, in a file stored in the executable profile data store 214. FIG. 6 illustrates one embodiment of a line of formatted data 602 for a monitored function event written to a profile file. In one embodiment, executable monitor 210 writes a line of data to the profile file for each function event, consistent with the format discussed with respect to FIG. 6, to capture all function events that occur while executable code 218 is run. As illustrated in FIG. 6, the data written by executable monitor 210 includes several pieces of data delimited by two commas.

In one embodiment, the first piece of data 604 describes what type of data will follow in the data entry 602. For example, '<' indicates a function call, '>' indicates a function return, '?' indicates a user-specified value used to mark a specific function, '-' indicates a system time at the end of a function run, and '+' indicates the total time elapsed. The second piece of data 606 is a name of the function subject to the current event. The third piece of data 608 is a unique identification for each function. However, the identification data is not included for function returns. The fourth piece of data 610 is a system time when the event, such as a detection of a user specified function marker, a function call, or a function return, as illustrated in line 602 was intercepted by executable monitor 210. The fifth piece of data 612 is thread identification data. In one embodiment, a thread ID is unique for each thread in a multithreaded execution environment, and indicates which thread the event of line 602 occurred in. In one embodiment, the threaded identification data enables executable monitor to capture data about the running executable code 218 that profile analyzer will utilize in order to profile the execution code 218 in a multithreaded runtime environment.

In one embodiment, executable monitor 210 monitors the function calls of running code 218 as the function calls occur. In one embodiment, profile analyzer 216 utilizes function identification data 608 to determine what function calls have been returned and the current state of the function stack (not shown) in the integrated development environment 102. As a result, in one embodiment, the function return does not incorporate unique identification data, as does a function call.

In one embodiment, profile analyzer 218 accesses the file, the file including lines of data for each function event monitored during the running of executable code 218, in executable profile data store 214. In one embodiment, profile analyzer 218 parses the data file to determine a function call hierarchy for the functions of executable code 218. In one embodiment, profile analyzer 218 utilizes the order in which function calls and returns were made to deduce the function call hierarchy of executable code 218 when it is run. For example, data for function events is stored by executable monitor 210 when a function is called and when a function finishes execution. If a second function is called after a first function call, but before the first function has finished, profile analyzer 216 may deduce that the second function was called within the first function, and is therefore a child of the first function. Based on an analysis of function call data, as well as timing data, profile analyzer 216 constructs a function call hierarchy to determine what functions are called within other functions, the time elapsed during execution of functions in the hierarchy, the ordering of function calls, the structure of function calls for an application, etc.

For example, the following is a C program:

```
int bar( ){
    return 0;
}
int foo( ){
    return bar( );
}
int main( ){
    foo( );
    bar( );
    return 0;
}
```

After compilation of the exemplary program above, executable monitor 210 profiles the execution of the binary for the program and stores the following in executable profile data store 214:

```
PROBE_BEGIN
Basic_Project
<main,,1,,12669411831760008556,,8751
<foo,,2,,12669411831760025213,,8751
<bar,,3,,12669411831760039691,,8751
>bar,,12669411831760049328,,8751
```

```
>foo,,12669411831 76055821,,8751
<bar,,4,,12669411 83176065334,,8751
>bar,,12669411 83176073506,,8751
>main,,1266941 1831 76079717,,8751
−12669411 83176117601
+109045
```

For illustrative purposes, because the above format is difficult to read, it shall be changed in the following manner. "<" and ">" will be changed to "("and")" respectively. Furthermore, for each "<", the function name will be written down followed by followed by "(", and a")" is written, for the example, for each ">". Following this convention, for the example, profile analyzer 216 analyzes the data stored in executable profile data store 214 and derives the following relationship:

main(foo(bar( ))bar( ))

The above illustrated relationship is reformatted for demonstrative purposes, since the profile analyzer 216 may parse and analyze the data stored in executable profile data store 214 without performing the above conversion. However, from the format illustrated above, profile analyzer 216 derives the call hierarchy of the program by determining that any function that is within the brackets of another is its child.

Thus, from the derived relationship, main is the root of the call hierarchy, and main makes one call to foo( ) and one call to baro( ). Furthermore, foo( ) calls bar( ) and bar( ) calls no other functions in the cases where it is called. Profile analyzer may therefore derive that main has two children, foo and bar, and foo has one child bar.

Based on the analysis of the profile data file, profile analyzer 216 renders a visualization of the deduced function call hierarchy utilizing the software development tools plug-in 230. In one embodiment, the visualizations discussed below in FIGS. 7A-D are rendered on a display device (not shown) to a user. The result is a visualization of the executable code's 218 runtime function call hierarchy. Furthermore, the hierarchy is rendered with data indicating how many times a function was called, the time elapsed for a function, etc. to impart knowledge of running executable code 218. In one embodiment, functions marked with user-specified values may be rendered in the visualizations of FIGS. 7A-7C with different colors, to denote which functions have been marked. The knowledge of the actual runtime data for function calls of executable code 218, as well as function markings, enables an application developer to tune and refine application code based on actual runtime data.

In one embodiment, profile analyzer 216 renders visualizations for executable code 218 in real time as executable code 218 is being run. In order for profile analyzer 216 to generate real time visualizations, executable monitor 210 writes lines of data to the executable profile file stored in executable profile data store 214 as the events are monitored in the running code 218. In one embodiment, profile analyzer 216 continuously parses the executable profile file for new lines of function event data. Based on newly parsed data, indicating different function events, profile analyzer 216 updates an existing executable code profile file and renders an updated visualization corresponding to the updated executable code profile. Thus, profile analyzer 216 not only provides a visualization for a function call hierarchy, but provides updated visualizations in real time. The updated visualizations provide a limited animation to further display the progress of executable code's 218 function hierarchy as the code is run. In one embodiment, the visualizations discussed below in FIGS. 7A-C contain special colorizations for functions that have been marked by the user and commands for quickly finding marked functions.

Figure 3:
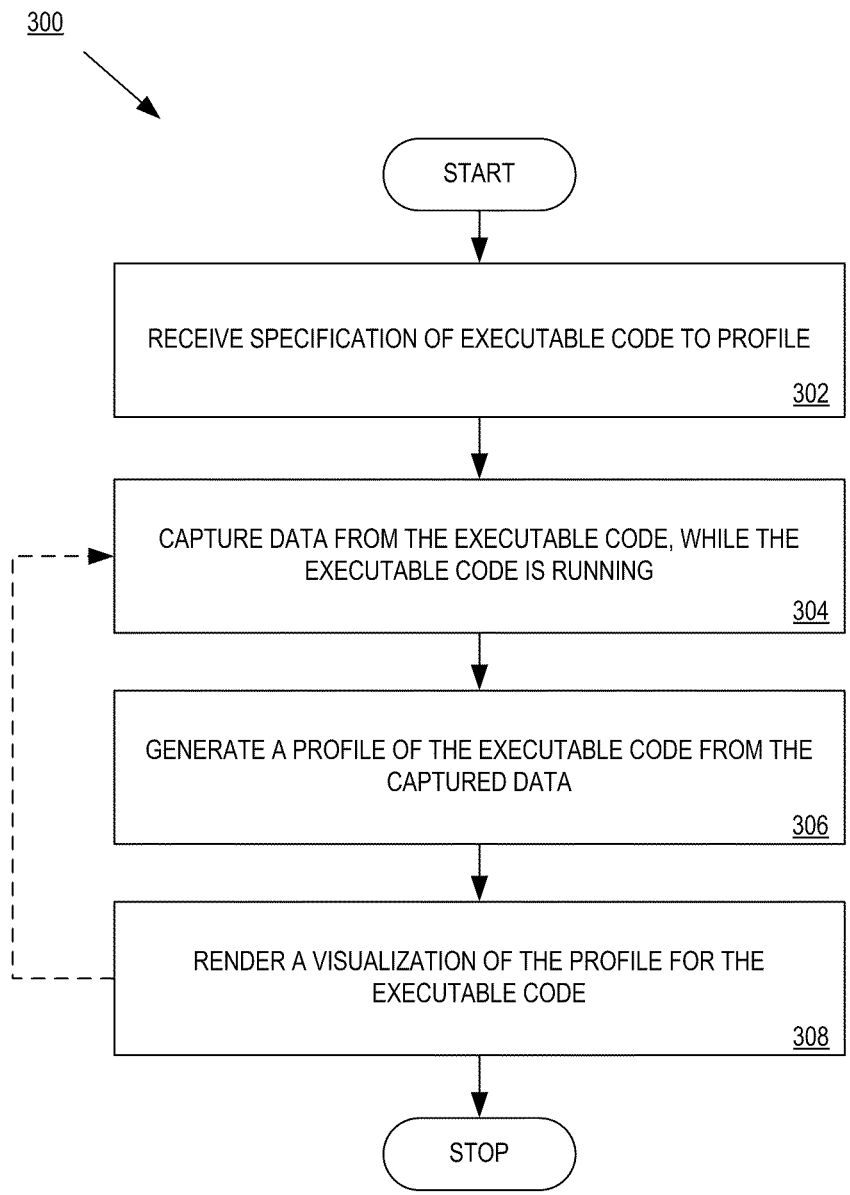
FIG. 3 is a flow diagram of one embodiment of a method for generating visualizations for executable code.

FIG. 3 is a flow diagram of one embodiment of a method 300 for generating visualizations for executable code. The method 300 is performed by processing logic that may comprise hardware (circuitry, dedicated logic, etc.), software (such as is run on a general purpose computer system or a dedicated machine), firmware (such as coded instructions stored in a memory), or a combination. In one embodiment, the method 300 is performed by an application profiler (e.g., application profiler 204 of FIG. 2).

Referring to FIG. 3, the process begins by receiving a specification of executable code to profile (processing block 302). In one embodiment, the specification of executable code corresponds to a user specification of executable code to be run in an integrated development environment. In one embodiment, the code may be specified, or otherwise selected, by a user in a graphical user interface of the integrated development environment.

Processing logic captures data from the executable code, while the executable code is running (processing block 304). In one embodiment, processing logic monitors the code for different events in the running executable code. The events include events such as function calls, function returns, and user-specified function markers. In one embodiment, data corresponding to each of these events is recorded in a profile file for the executable code.

Processing logic then generates a profile of the executable code from the captured data (processing block 306). As discussed above, function calls and returns within an original function may be utilized to deduce a function call hierarchy for executable code. This function call hierarchy may then serve as a profile for executable code.

Processing logic renders a visualization of the profile for the executable code (processing block 308). In one embodiment, processing logic may render the profile for the executable code in different ways, such as the visualizations illustrated and discussed below in FIGS. 7A-D.

In one embodiment, processing logic returns to processing block 304 to capture additional data for running executable code. In this embodiment, processing logic is enabled to update existing profile data for running executable code in processing block 306 and updates the rendered visualization 308 according to newly captured runtime data for executable code. In this embodiment, a rendered visualization is updated in real time as executable code is run to provide a user with a picture of a runtime function call hierarchy, and insight into how the function call hierarchy develops.

Figure 4:
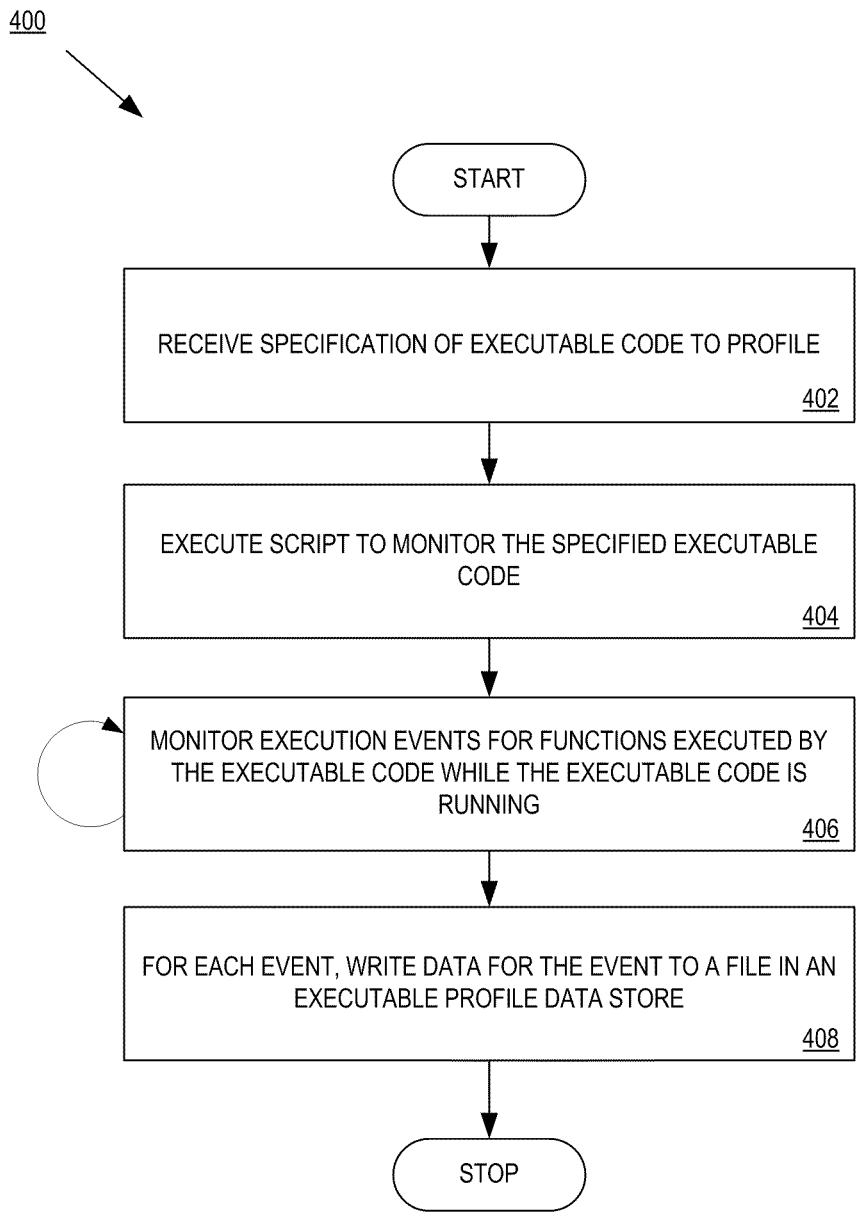
FIG. 4 is a flow diagram of one embodiment of a method for capturing profile data for executable code.

FIG. 4 is a flow diagram of one embodiment of a method 400 for capturing profile data for executable code. The method 400 is performed by processing logic that may comprise hardware (circuitry, dedicated logic, etc.), software (such as is run on a general purpose computer system or a dedicated machine), firmware (such as coded instructions stored in a memory), or a combination. In one embodiment, the method 400 is performed by an executable monitor of an application profiler (e.g., executable monitor 210 of FIG. 2).

Referring to FIG. 4, the process begins by receiving a specification of executable code to profile (processing block 402). Processing logic executes a script to monitor the specified executable code (processing block 404). In one embodiment, the script is run in an integrated development environment. In one embodiment, the script is a SYSTEMTAP™ script.

Processing logic monitors execution events for functions executed by the executable code while the executable code is running (processing block 406). For each event, processing logic writes data for the event to a file in an executable profile data store (processing block 408). In one embodiment, processing logic appends a line of data to an executable code profile file for each monitored event. In one embodiment, each line of data records different pieces of data such as a type of event, name of a function for the event, function identification data, thread identification data, user-specified function marker values, and a system time when the event occurred. In one embodiment, the line of data is formatted as discussed above with respect to FIG. 6. Thus, processing logic captures raw data for running executable code that enables a function call hierarchy to be deduced from the data.

Figure 5:
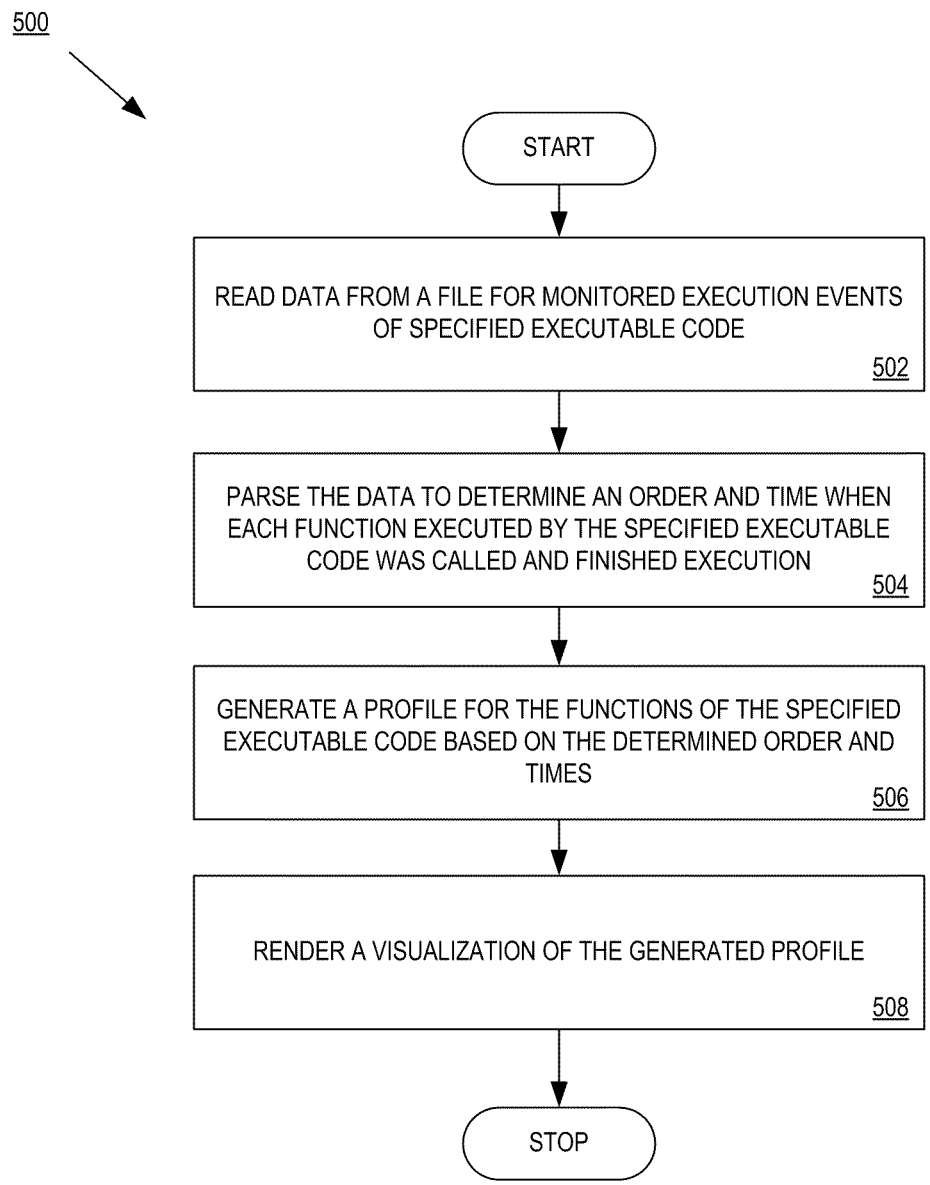
FIG. 5 is a flow diagram of one embodiment of a method for rendering a visualization for executable code.

FIG. 5 is a flow diagram of one embodiment of a method 500 for rendering a visualization for executable code. The method 500 is performed by processing logic that may comprise hardware (circuitry, dedicated logic, etc.), software (such as is run on a general purpose computer system or a dedicated machine), firmware (such as coded instructions stored in a memory), or a combination. In one embodiment, the method 500 is performed by a profile analyzer of an application profiler (e.g., profile analyzer 216 of FIG. 2).

Referring to FIG. 5, the process begins by reading data from a file for monitored execution events of specified executable code (processing block 502). Processing logic parses the data to determine the order and time when each function was called and when each function finished execution (processing block 504). As discussed above, in one embodiment, the file includes lines of data corresponding to different events monitored during the running of executable code. In one embodiment, each line of data includes timing data to indicate to processing logic when the event occurred. In one embodiment, processing logic generates a profile for the functions based on the determined order and times (processing block 506). In one embodiment, processing logic utilizes the order of the called functions to deduce a function call hierarchy of the executable code.

Processing logic then renders a visualization of the generated profile (processing block 508). The visualization is rendered to a user in one of several formats, such as the visualizations of illustrated in FIGS. 7A-D. FIGS. 7A-D illustrate exemplary embodiments of application profile visualizations in a graphical user interface 702 of the integrated development environment 102.

Figure 7A:
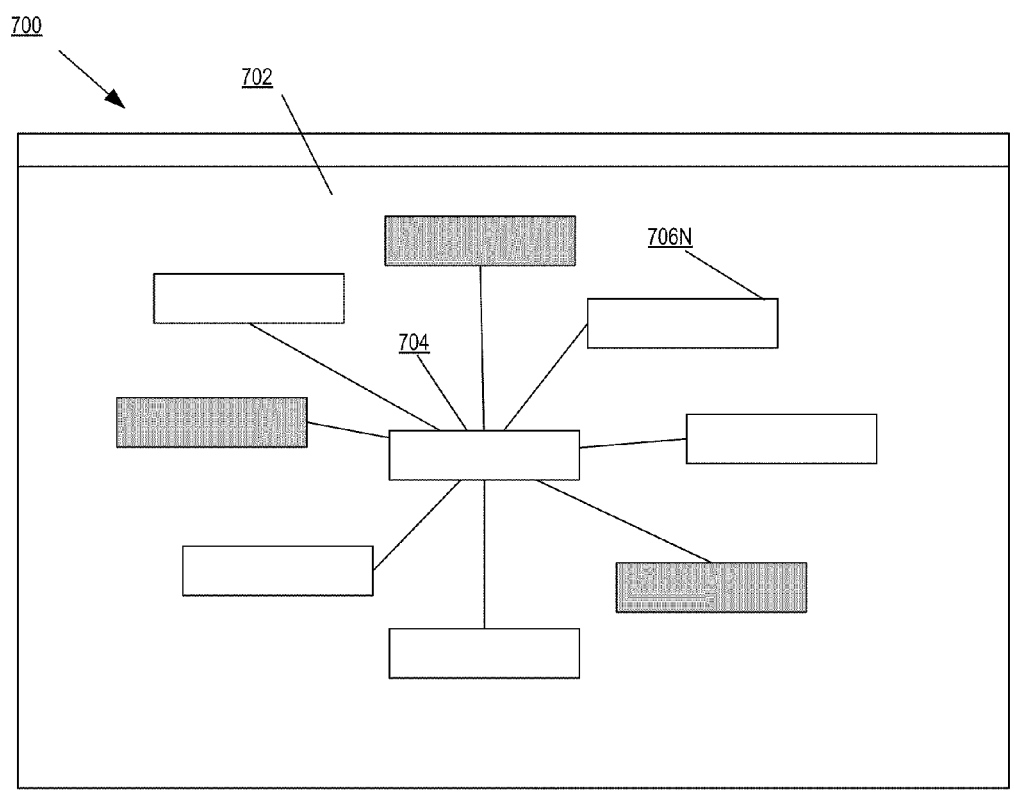
FIG. 7A illustrates an exemplary embodiment of a radial view visualization of executable code.

FIG. 7A illustrates an exemplary embodiment of a radial view visualization 700. In one embodiment, the radial view visualization 700 renders function call dependency relationships. In one embodiment, child functions 706N are displayed as depending from a central function 704.

Figure 7B:
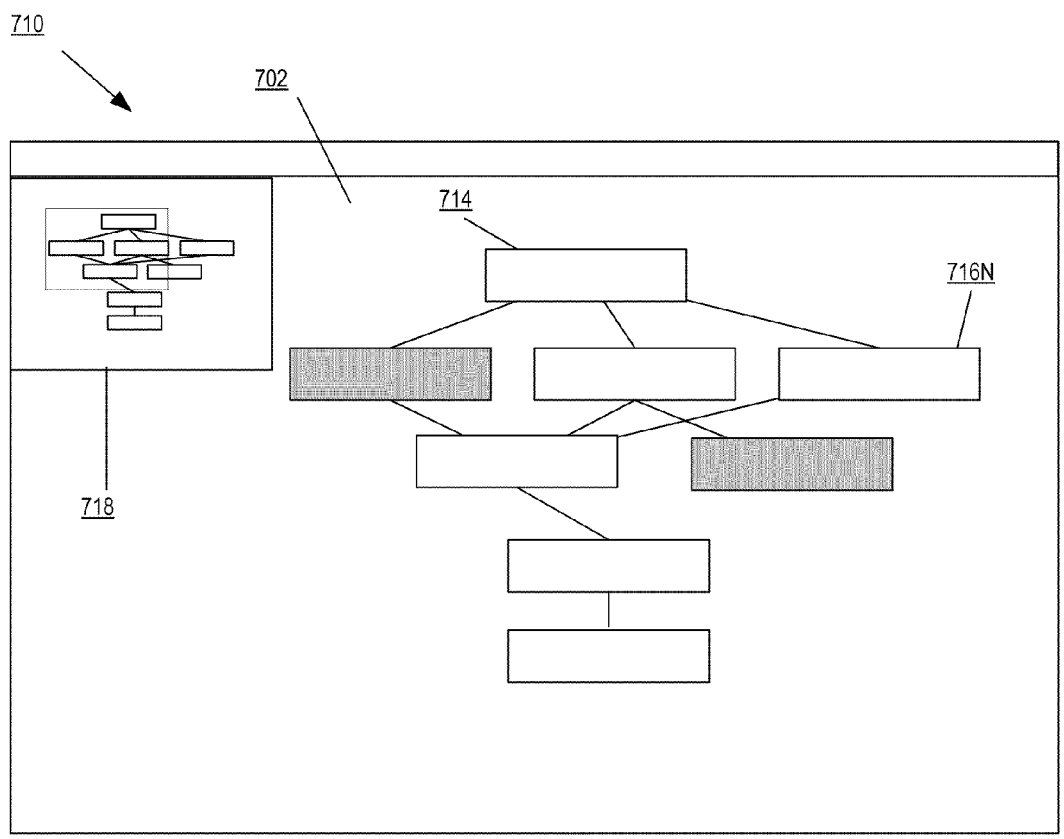
FIG. 7B illustrates an exemplary embodiment of a tree view visualization of executable code.

FIG. 7B illustrates an exemplary embodiment of a tree view visualization 710. In one embodiment, the tree view visualization 710 renders a condensed tree structure that displays all descendents 716N of a given function 714. In one embodiment, tree view visualization 710 includes a zoom box 718 that enables a condensed display of an entire tree view and enables a user to select portions of a tree view to be displayed in greater detail.

Figure 7C:
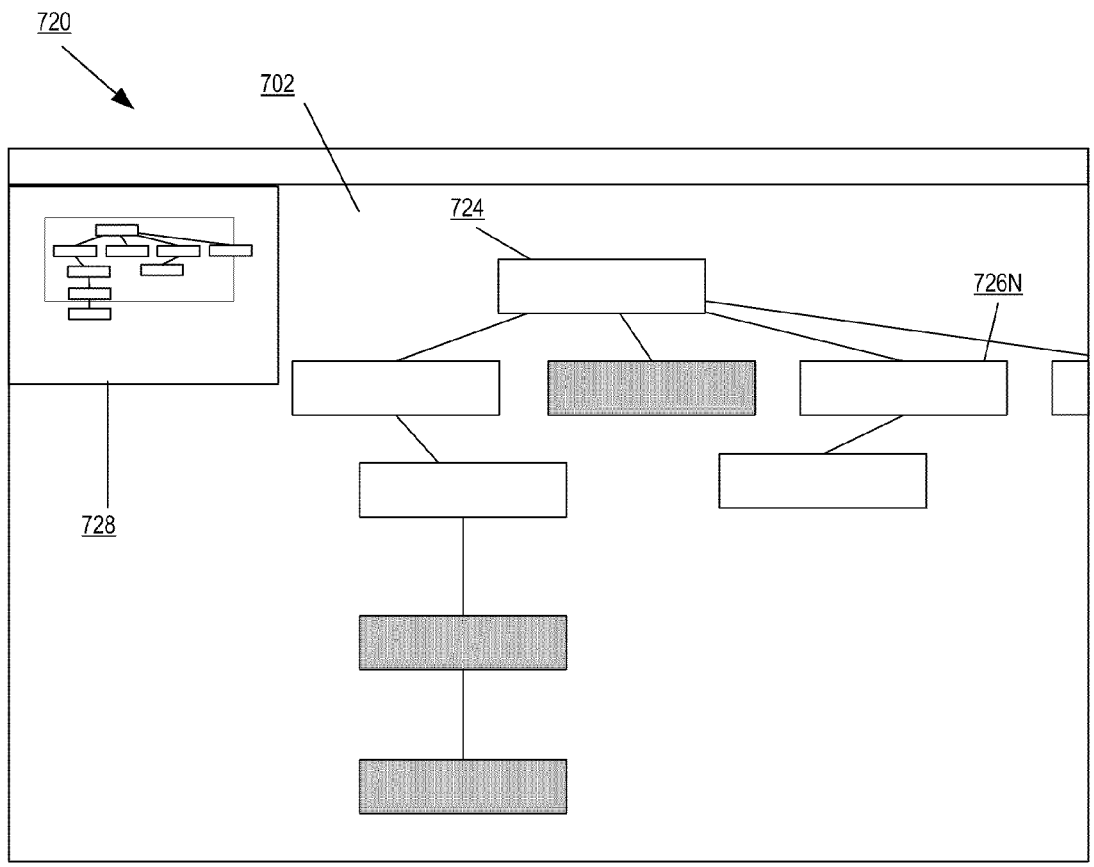
FIG. 7C illustrates an exemplary embodiment of a box view visualization of executable code.

FIG. 7C illustrates an exemplary embodiment of a box view visualization 720. In one embodiment, box view visualization 720 renders all descendents 726N of a certain function 724. In one embodiment, box view visualization 720 includes a zoom box 728 that enables a user to render a selected portion of the box view visualization 720 in greater detail.

Figure 7D:
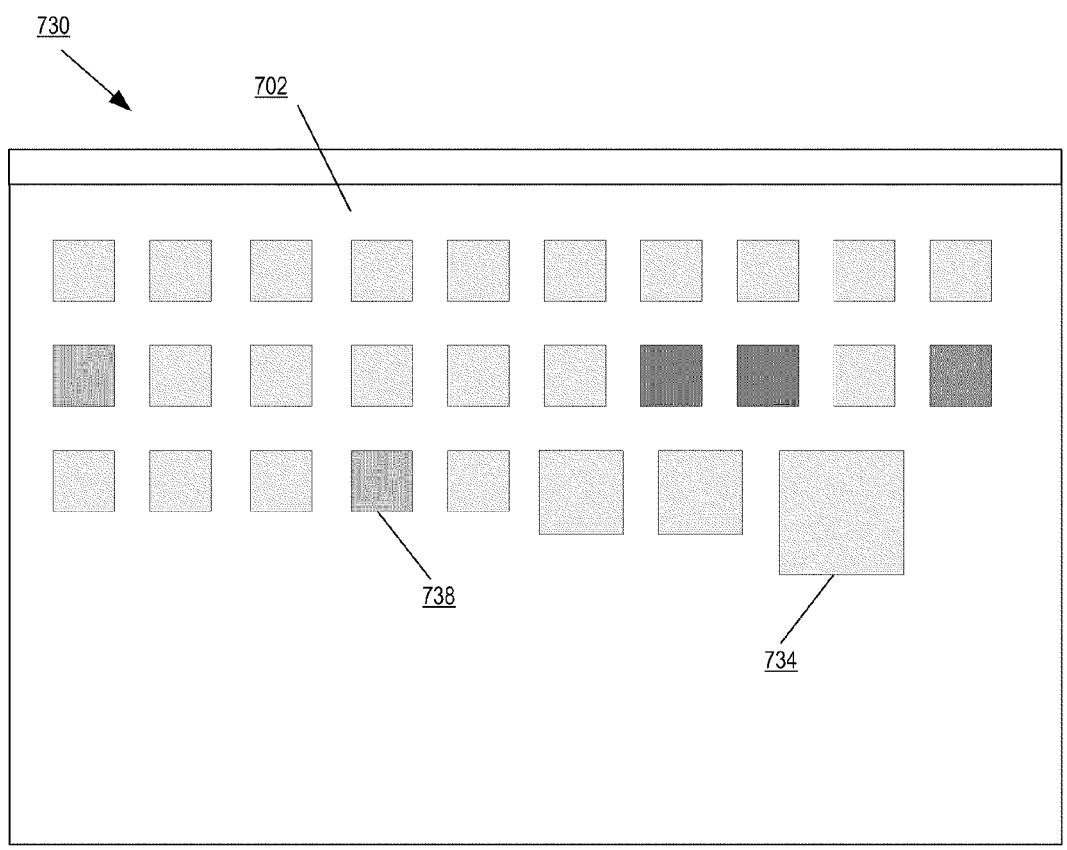
FIG. 7D illustrates an exemplary embodiment of an aggregate view visualization of executable code.

FIG. 7D illustrates an exemplary embodiment of an aggregate view visualization 730. In one embodiment, the aggregate view visualization 730 renders functions as boxes, such as boxes 734 and 738. In one embodiment, the boxes are rendered at varying sizes relative to the time taken for all instances of that function to execute. In one embodiment, the boxes are further rendered with different colors that represent the number of times that function was called.

In one embodiment, graphical user interface 702 of FIGS. 7A-C includes a collapse and uncollapse function. In one embodiment, a collapse command will cause all instances of a function to be grouped together in a single node within a rendered visualization. For example, for instance of function B where A→B, all instances of function B will be grouped into a single rendered node in an application visualization. In one embodiment, an uncollapse command will cause all instances of a function to be displayed. For example, for instance of a function B where A→B, each instance of B will be rendered with its own separate node in an application visualization.

Figure 8:
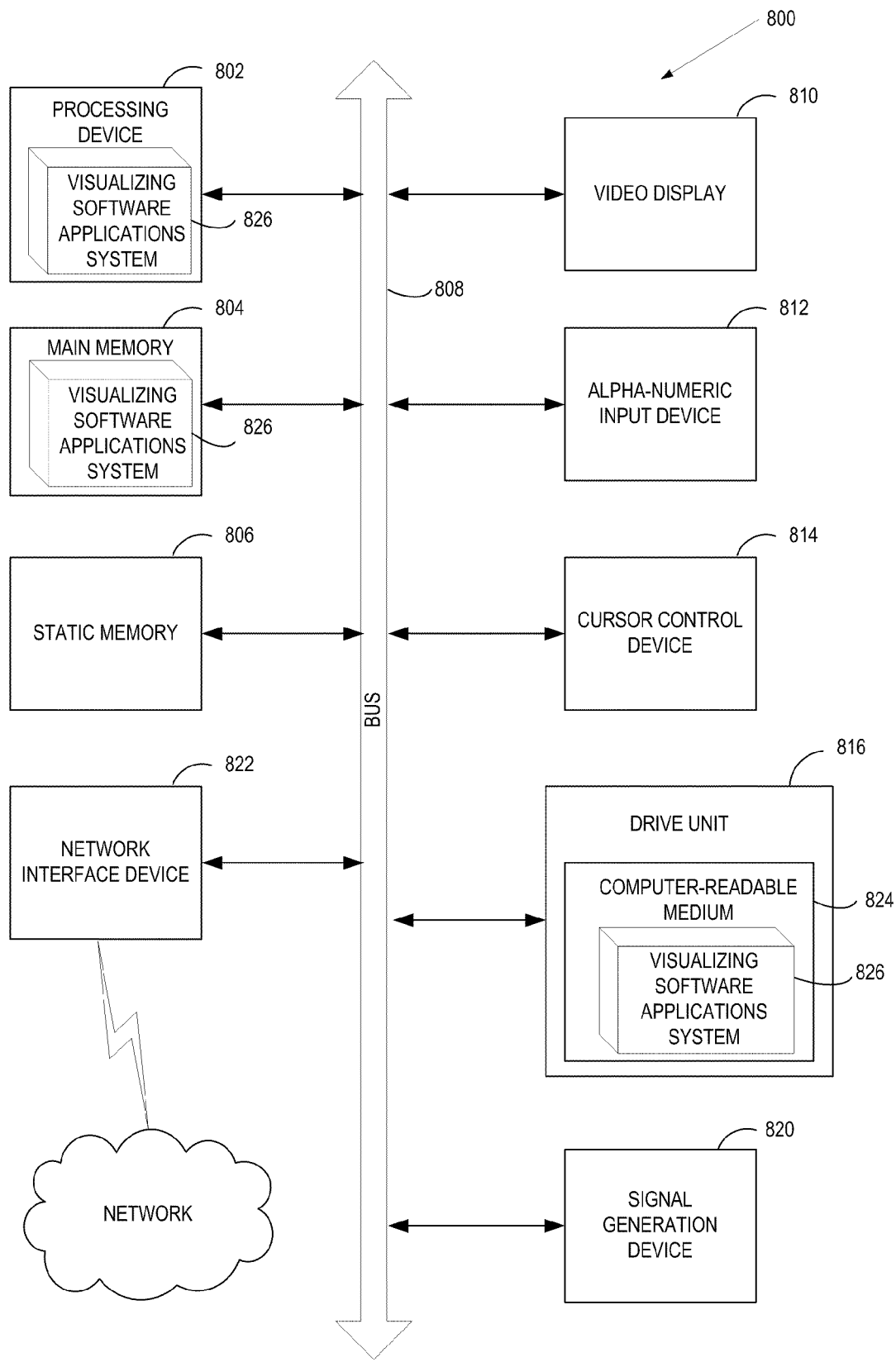
FIG. 8 illustrates a diagrammatic representation of a machine in the exemplary form of a computer system.

FIG. 8 illustrates a diagrammatic representation of a machine for visualizing software applications in the exemplary form of a computer system 800. Within the computer system 800 is a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 816 may include a machine-readable storage medium (or more specifically a computer-readable storage medium) 824 on which is stored one or more sets of instructions (e.g., visualizing software applications system 826) embodying any one or more of the methodologies or functions described herein. The visualizing software applications system 826 may also reside, completely or at least partially, within the main memory 804 and/or within the processing device 802 during execution thereof by the computer system 800, the main memory 804 and the processing device 802 also constituting machine-readable storage media. The visualizing software applications system 826 may further be transmitted or received over a network via the network interface device 822.

While the machine-readable storage medium 824 is shown in an exemplary embodiment to be a single medium, the term "machine-storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "monitoring", "capturing", "generating", "rendering", "writing", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Thus, a method and apparatus for generating visualizations from running executable code has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:

monitoring an executable software application while the executable software application is running;

capturing, by a processing device, data indicative of at least one pair of function call and function return occurring while the executable software application is running from a start time of running the executable software application to a current time, to yield captured data;

storing the captured data in a file comprising at least one line of formatted data, each of the at least one line of formatted data comprising a start time of a function call, an end time of a function return, and a thread identification data indicating on which thread the function call and the function return occur;

generating, by the processing device in view of the captured data stored in the file, a profile of the executable software application;

determining, by the processing device in view of the profile, a function call hierarchy for the executable software application in view of timing data associated with the at least one pair of function call and function return associated with the thread and in view of an order of function calls and function returns, wherein a second function is determined to be a child function of a first function in the function call hierarchy when the function call associated with the second function occurs after the function call associated with the first function and before the function return associated with the first function; and rendering a visual display of the profile and the function call hierarchy.

2. The method of claim 1, further comprising:
capturing additional data indicative of a new runtime event from the executable software application; and
while the executable software application is running, generating an updated profile of the executable software application from the profile and the additional data, and rendering an updated visual display, the updated visual display rendered as additional data becomes available and updated profiles are generated.

3. The method of claim 1, wherein monitoring further comprises executing a script in an integrated development environment while the executable software application is running.

4. The method of claim 1, wherein the executable software application runs in a multithreaded execution environment and the at least one line of formatted data comprises a plurality of thread identification data indicative on which threads the function call and the function return occur.

5. The method of claim 1, further comprising:
capturing user-specified function markers in the executable software application.

6. The method of claim 1, wherein the executable software application is one of a C or C++ based software application.

7. The method of claim 1, wherein the visual display is rendered on a display device coupled with the processing device, and the visual display is one of a radial view, tree view, box view, or aggregate view visual display of the executable software application.

8. A non-transitory computer readable storage medium storing instructions, which when executed on a processing device, cause the processing device to:
monitor an executable software application while the executable software application is running;
capture, by the processing device, data indicative of at least one pair of function call and function return occurring while the executable software application is running from a start time of running the executable software application to a current time, to yield captured data;
store the captured data in a file comprising at least one line of formatted data, each of at least one line of formatted data comprising a start time of a function call, an end time of a function return, and a thread identification data indicating on which thread the function call and the function return occur;
generate, in view of the captured data stored in the file, a profile of the executable software application;
determine, by the processing device in view of the profile, a function call hierarchy for the executable software application in view of timing data associated with the at least one pair of function call and function return associated with the thread, and in view of an order of function calls and function returns, wherein a second function is determined to be a child function of a first function in the function call hierarchy when the function call associated with the second function occurs after the function call associated with the first function and before the function return associated with the first function; and
render a visual display of the profile and the function call hierarchy.

9. The non-transitory computer readable storage medium of claim 8, the processing device is further to:
capture additional data indicative of a new runtime event from the executable software application; and
while the executable software application is running, generate an updated profile of the executable software application from the profile and the additional data, and rendering an updated visualization, the updated visualization rendered as additional data becomes available and updated profiles are generated.

10. The non-transitory computer readable storage medium of claim 8, wherein to monitor the executable software application, the processing device is further to execute a script in an integrated development environment while the executable software application is running.

11. The non-transitory computer readable storage medium of claim 8, wherein the executable software application runs in a multithreaded execution environment and the at least one line of formatted data comprises a plurality of thread identification data indicative on which threads the function call and the function return occur.

12. The non-transitory computer readable storage medium of claim 8, wherein the processing device is further to capture user-specified function markers in the executable software application.

13. The non-transitory computer readable storage medium of claim 8, wherein the executable software application is one of a C or C++ based software application.

14. The non-transitory computer readable storage medium of claim 8, wherein the visual display is rendered on a display device coupled with the processing device, and the visual display is one of a radial view, tree view, box view, or aggregate view visual display of the executable software application.

15. A system comprising:
a processing device;
a memory to store executable software application profile data, which when executed by the processing device, cause the processing device to:
monitor an executable software application while the executable software application is running;
capture data indicative of at least one pair of function call and function return occurring while the executable software application is running from a start time of running the executable software application to a current time, to yield captured data;
store the captured data in a file comprising at least one line of formatted data, each of at least one line of the formatted data comprising a start time of a function call, an end time of a function return, and a thread identification data indicating on which thread the function call and the function return occur;
generate, in view of the captured data stored in the file, a profile of the executable software application;
determine, in view of the profile, a function call hierarchy for the executable software application based on timing data associated with the at least one pair of function call and function return associated with the thread and in view of an order of function calls and function returns, wherein a second function is determined to be a child function of a first function in the function call hierarchy when the function call associated with the second function occurs after the function call associated with the first function and before the function return associated with the first function; and
render a visual display of the profile and the function call hierarchy.

* * * * *